United States Patent [19]

Shukla et al.

[11] 4,401,879
[45] Aug. 30, 1983

[54] SELF-REGULATING ELECTRICAL RESISTANCE HEATER AND FUEL SUPPLY SYSTEM USING THE HEATER

[75] Inventors: Vishwa N. Shukla, Attleboro; Bernard M. Kulwicki, Foxboro, both of Mass.

[73] Assignee: Texas Instruments Incorporated, Dallas, Tex.

[21] Appl. No.: 236,389

[22] Filed: Feb. 20, 1981

[51] Int. Cl.³ .............................................. B60L 1/02
[52] U.S. Cl. .................................... 219/206; 219/541; 219/381; 219/205; 219/374; 219/307; 338/22 R
[58] Field of Search ............... 219/205, 206, 207, 307, 219/374, 375, 376, 381, 382, 504, 505, 541; 338/22 R, 23; 252/518, 520; 174/126 CP

[56] References Cited

U.S. PATENT DOCUMENTS

| | | | |
|---|---|---|---|
| 3,023,390 | 2/1962 | Moratis et al. | 338/309 |
| 3,676,211 | 7/1972 | Kourtesis et al. | 29/589 |
| 3,927,300 | 12/1975 | Wada et al. | 219/381 |
| 4,032,752 | 6/1977 | Ohmura et al. | 219/541 |
| 4,108,125 | 8/1978 | Marcoux et al. | 219/206 |
| 4,189,509 | 2/1980 | Hill | 427/102 |
| 4,232,214 | 11/1980 | Shioi et al. | 219/541 |

FOREIGN PATENT DOCUMENTS

1252490 11/1971 United Kingdom .

OTHER PUBLICATIONS

Ohmic Contacts to Semiconducting Ceramics by D. R. Turner and H. A. Sauer, J. Electrochem. Soc. 107, 240, (1960).
Electrodes for Ceramic Barium Titanate Type Semiconductors by Harry M. Landis, J. Applied Physics 36(6), pp. 2000–2001, (1965).
Formation of Ohmic Contacts In Semiconducting Oxides by J. Narayan and V. N. Shukla, J. Applied Physics 51(6), pp. 3444–3446, (1980).

Primary Examiner—B. A. Reynolds
Assistant Examiner—Teresa J. Walberg
Attorney, Agent, or Firm—James P. McAndrews; John A. Haug; Melvin Sharp

[57] ABSTRACT

A fuel supply system having means for furnishing a mixture of air and alcohol or gasohol fuels to an automotive engine has a self-regulating, ceramic, electrical resistance heater for enhancing fuel evaporation during cold engine starting and incorporates a heater of improved structure to maintain stable heating properties in the alcohol-based system over a long service life. The heater has thin, all-metal contacts of electroless, deposited nickel formed directly on a ceramic material of positive temperature coefficient of resistivity in ohmic contact relation to the ceramic material and has a thin, substantially pore-free outer coating of electrolytically deposited nickel covering and shielding the ohmic contacts from the effects of an alcohol vapor atmosphere, whereby the ohmic contacts retain their contacting properties during thermal cycling in engagement with the oxygen-rich ceramic material and in the alcohol atmosphere so that the fuel supply system maintains uniform fuel evaporation properties over a long service life.

10 Claims, 4 Drawing Figures

SELF-REGULATING ELECTRICAL RESISTANCE HEATER AND FUEL SUPPLY SYSTEM USING THE HEATER

BACKGROUND OF THE INVENTION

The invention relates to early fuel evaporation types of fuel supply systems using self-regulating ceramic resistance heaters and the invention relates more particularly to a system incorporating a heater having novel contact means which provide the system with improved service life characteristics when used with alcohol or gasohol fuels.

Electrical resistance heaters formed of ceramic materials of positive temperature coefficient of resistivity are known to sharply increase in resistivity as they are heated above the Curie temperatures of the materials and are known to self-regulate at predetermined temperatures to provide selected, safe, heating effects. That is, the heaters generate a substantial amount of heat when they are first energized but then display greater resistance and reduce heater current as they heat up, thereby to decrease their rate of heat generation until they stabilize at a temperature at which the rate of heat generation by the reduced current balances the rate of heat dissipation from the heaters. Such heaters have been arranged in automotive fuel supply systems to be energized when operation of the automotive engine is initiated as is shown in U.S. Pats. No. 3,987,772, No. 4,107,515, No. 4,180,901, No. 4,189,509, No. 4,189,700, No. 4,108,125 and No. 4,141,327. In those systems, the heaters provide a prompt heat output sufficient to enhance fuel evaporation to facilitate smooth engine starting on a cold day and to reduce the emission of pollutants in the engine exhaust during engine warm-up period. The heater stabilizes at a safe maximum temperature level below the fuel ignition temperature and reduces its rate of power consumption as engine warm-up occurs.

Many different types of coatings have been provided on selected portions of the bodies of such self-regulating ceramic heaters to serve as contacts or electrodes for applying electrical power to the ceramic resistance materials as is shown in "Ohmic Contacts to Semiconducting Ceramics" by D. R. Turner and H. A. Sauer, J. Electrochem. Soc. 107,240 (1960); U.S. Pat. No. 3,023,390; "Electrodes for Ceramic Barium Titanate Type Semiconductors" by Harry M. Landis, J. Applied Physics 36(6) pp. 2000–2001 (1965); U.S. Pat. No. 3,676,211; U.S. Pat. No. 3,927,300; U.S. Pat. No. 4,055,438; U.S. Pat. No. 4,032,752; U.S. Pat. No. 4,189,509; "Formation of Ohmic Contacts in Semiconducting Oxides" by J. Narayan and V. N. Shukla, J. Applied Physics 51(6), pp. 3444–3446 (1980); and U.S. Pat. No. 4,232,214. Some coatings form ohmic contacts which have low electrical resistance, which are non-rectifying, and which have the property that the potential difference across the contacts to the ceramic material is proportional to the current being applied to the ceramic material through the contacts in accordance with Ohm's law. Other coatings form higher resistance, non-ohmic contacts to the ceramic materials. Some known coatings embody expensive materials; some are difficult to apply to selected areas of the ceramic surface; some age or display increasing resistance as they are thermally cycled in engagement with the oxygen-rich ceramic materials so that they tend to provide varying heating effects; and some tend to lose their bond to the ceramic material during thermal cycling. Further, some coatings are suitable for use in certain high voltage applications but are considered unsuitable for use in other types of lower voltage systems. In this regard, known contact systems for such ceramic heaters do not appear suitable for successful, low cost commercial use in early fuel evaporation systems for automobiles where alcohol or gasohol fuels may be encountered. Such known contact systems appear to be either too expensive to use; too high in initial resistance properties; or too subject to change in resistance characteristics during use in an alcohol vapor atmosphere so that they tend to fail or to provide varying heating effects over the life of the automotive fuel supply system.

It is an object of this invention to provide a novel and improved self-regulating ceramic resistance heater; to provide such a heater which is particularly adapted for use in a alcohol vapor atmosphere; to provide such a heater which is adapted to display stable heating characteristics over a long service life when operated from a low voltage automotive power source in an early fuel evaporation system where alcohol or gasohol fuels may be used; and to provide a novel and improved automotive fuel supply system adapted for use with alcohol or gasohol fuels.

SUMMARY OF THE INVENTION

Briefly described, the novel and improved self-regulating ceramic resistance heater of this invention comprises a heater body of a ceramic material such as a doped barium titanate or the like having a positive temperature coefficient of resistivity which is adapted to display a sharp increase in resistivity when heated to a characteristic Curie or transition temperature so that it tends to stabilize at a generally predetermined, safe, maximum temperature level. The ceramic body is provided in flat disc form, in multipassaged or honeycomb configuration, or in any other desired shape within the scope of this invention, and electrical contacts are formed on selected areas of the ceramic heater for applying electrical power to the ceramic resistance material. The heater body is incorporated in an otherwise conventional automobile fuel supply system, typically including a carburetor or the like, for use with alcohol or gasohol fuels, thereby to provide a mixture of air and fuel to the automotive engine. The heater is arranged so that the heater contacts are electrically connected to the low voltage automotive power source for energizing the heater when operation of the automotive engine is initiated. Th heater is disposed to heat one or more components of the air-fuel mixture being furnished to the engine. In accordance with this invention, the electrical contacts include a thin metal coating of electroless deposited nickel which is applied to the ceramic material and subjected to heat treatment in conventional manner to form low resistance, ohmic contact to the ceramic body. The thickness of that first coating is regulated to be thin enough to reduce any tendency for the coating to pull away from the ceramic material due to thermal expansion differences during thermal cycling but is preferably thick enough, from 0.00001 to 0.003 inches (0.0025–0.0075 mm.), to assure that the coating is continuous and free of significant pores or openings over the selected contact areas of the heater body. In accordance with this invention, the contact means further include an additional outer coating of electrolytically deposited nickel which is continuous and substantially pore-free over the extent of the first coating for covering and shielding the first coating from alcohol vapor in the atmosphere surrounding the heater. If desired, an intermediate coating of a material such as copper or silver having relatively higher electrical conductivity than nickel is located between the first and outer coatings of the contact means to improve the current capacity of the contact means.

In that arrangement, the first, electroless deposited nickel coatings are easily and economically applied to selected areas of the ceramic heater body. They provide low resistance ohmic contact to the ceramic material and therefore serve to efficiently apply power to the heater even from a low voltage automotive power source. In that way, the heater is adapted to efficiently utilize an allotted portion of the automotive power supply capacity to achieve a desired heating effect in the fuel supply system for early fuel evaporation purposes. As applied in conventional manner, the electroless deposited nickel coatings are adapted to be thermally cycled in engagement with the oxygen-rich ceramic materials throughout a long service life without significant loss of their desirable, low resistance ohmic contacting properties. The heater is therefore operable throughout a long service life without significant reduction in its heating effect so that the system continues to fulfill its early fuel evaporation functions for achieving smooth engine operation. The electroless nickel coatings are easily applied in a thin continuous form to the ceramic material so that the first coatings are well bonded to the ceramic but are free of openings or large pores across the extent of the contact areas. Accordingly, the electrolytically deposited nickel coatings are easily formed in a continuous, pore-free manner over the inner coatings to shield the inner coatings from the effects of an alcohol vapor atmosphere. The outer coatings are also hard and well bonded to the underlying coating. In this regard, it has been found that although flame-sprayed aluminum, electroless deposited nickel, and other previously known ohmic contact coatings for ceramic heater materials have been found compatible for use in early fuel evaporation types of automotive fuel supply systems such contact coatings have been of limited usefulness either because of low current capacity or service life properties when thermally cycled from a low voltage power supply in an alcohol vapor at or near the Curie temperature of the materials in automobile applications. On the other hand, although electrolytically deposited nickel coatings are not considered fully desirable for making direct ohmic contact to ceramic titanate materials and the like, electrolytically deposited nickel does retain suitable contact surface resistance characteristics in the alcohol atmosphere, does remain largely unaffected by thermal cycling in an alcohol atmosphere, and when applied in a pore-free manner over the all-metal first ohmic contact coating, does effectively protect the inner electroless deposited nickel coating from the atmosphere so that the inner coating continues to fulfill its ohmic contacting function through a long service life. Further, particularly where the intermediate high conductivity coatings are embodied in the contact means, the system is operable at high current levels throughout that long service life. Accordingly, the novel and improved heater and the fuel supply system incorporating that heater as provided by this invention achieve new and advantageous results.

Other objects, advantages and details of the novel and improved heater and fuel supply system of this invention appear in the following detailed description of preferred embodiments of the invention, the detailed description referring to the drawings in which.

DESCRIPTION OF THE PREFERRED EMBODIMENT

Figure 1:
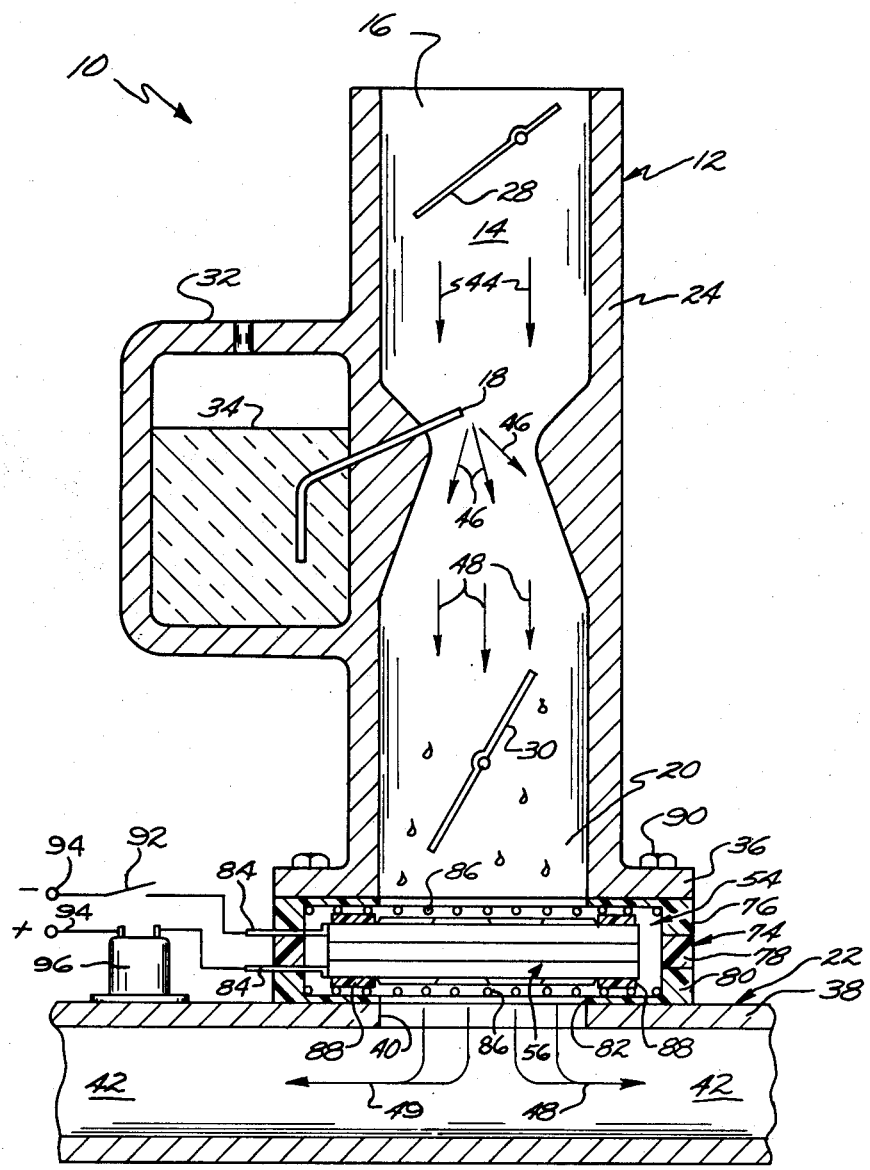
FIG. 1 is a section view along the vertical axis of the fuel supply system of this invention.

Referring to the drawings, 10 in FIG. 1 indicates the novel and improved fuel supply system of this invention which preferably includes fuel supply means of any conventional type such as the carburetor 12 diagrammatically shown in FIG. 1 having an air-fuel passage 14, having an air inlet 16 to the passage, having a fuel inlet 18 to the passage for mixing air and fuel in the passage, having an outlet 20 from the passage for delivering the air-fuel mixture to the internal combustion engine 22, having a body 24 defining a venturi 26 portion of the passage, and having choke valve means 28, throttle valve means 30, and a supply chamber 32 for the fuel 34. A flange 36 mounts the carburetor on the intake manifold 38 of the engine with the passage 14 aligned with an opening 40 into the manifold passage 42 leading into the engine. The carburetor 12 or other fuel supply means is adapted by adjustment or the like for furnishing a suitable mixture of air and an alcohol or gasohol fuel to the engine 22 to meet the requirements of engine operation in any conventional manner. That is, the carburetor is arranged so that a vacuum established in the intake manifold when the engine is running draws air into the inlet 16 as indicated by the arrows 44 in FIG. 1 and the reduced pressure of the venturi 26 draws fuel into the passage as shown at 46, thereby to furnish an air-fuel mixture 48 to the engine. The choke valve means respond to the intake of air and to thermally responsive spring means to assure that the air-fuel mixture 48 furnished to the engine is sufficiently rich in fuel to facilitate smooth starting when engine operation is initiated on a cold day, and the throttle valve means are selectively movable to regulate the volume of air-fuel mixture furnished to the engine to regulate engine speed and the like.

The fuel supply system 10 further includes self-regulating electrical resistance heater means 54 which are preferably arranged to be energized when operation of the engine 22 is initiated for heating the air-fuel mixture 48 before it is delivered to the engine. In that way, the heater means operate promptly after engine start-up to assure full vaporization of the fuel constituent of the mixture, thereby to assure smooth engine starting on a cold day and to reduce the emission of pollutants such as unburned hydrocarbons in the engine exhaust during the engine warm-up period.

The heater means 54 preferably comprises a multi-passaged or honeycombed heater body 56 of a ceramic material of positive temperature coefficient of resistivity having a plurality of passages 58 which extend in spaced side-by-side relation to each other between opposite ends of the body 56 for defining thin webs 59 of the resistor material between adjacent body passages.

Figure 3:
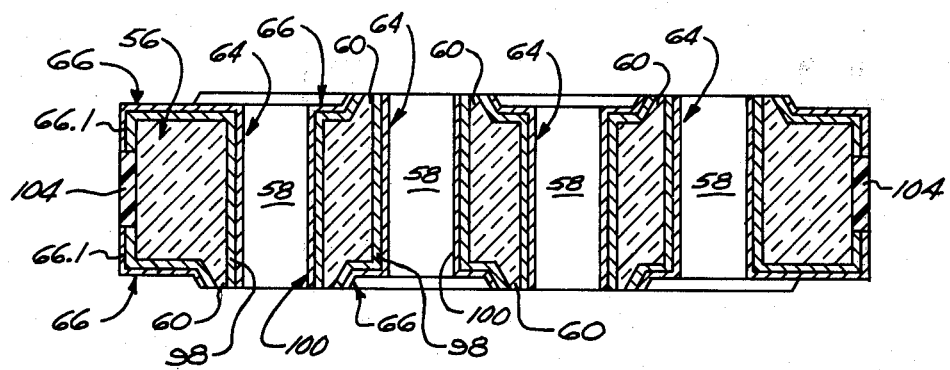
FIG. 3 is a section view to enlarge scale along the vertical axis of the heater of FIG. 2 as indicated by lines 3—3 in FIG. 1.

Abutments 60 of the ceramic material are preferably provided around the ends of alternate passages at one end of the body and around the ends of the other passages at the opposite end of the body. Electrical contact means 64 are provided on the heater body for applying electrical power to the ceramic resistance material to generate heat. Preferably, as shown in FIG. 3, the contact means 64 are provided along the walls of the passages 58, the contacts 64 in alternate ones of the passages being interconnected at one end of the body and the contacts 64 in the other passages being interconnected at the opposite end of the body as is indicated at 66 in FIG. 1. Preferably the interconnecting means 66 extend down the outer sides of the heater body as indicated at 66.1 in FIG. 3. The heater means 54 also preferably include a housing 74 with sections 76, 78 and 80 having central openings 82, include terminals 84 connected to the interconnecting means 66.1 to extend from the housing 74, include screen means 86 to aid in dispersing fuel droplets entering the heater and to prevent grit from the heater entering the engine, include pads 88 of electrical insulating material to aid in locating the heater body in the housing 74, and include mounting screws 90 for locating the heater 54 between the carburetor 12 and the intake manifold 38. Alternately, of course, self-regulating heater means 54 utilizing heater bodies of disc shape or the like are also within the scope of this invention.

In the preferred embodiment of this invention, the heater terminals 84 are electrically connected through the ignition switch 92 or the like to the low voltage automotive power supply 94 as is diagrammatically illustrated in FIG. 1. In that arrangement, the heater means 54 is operable when engine operation is initiated on a cold day so that the heater means promptly assure full vaporization of the fuel being furnished to the engine, thereby to assure smooth start-up of the engine and to reduce the emission of pollutants in the engine exhaust. The self-regulating heater means 54 stabilize at a safe, maximum temperature level below the ignition temperature of the air-fuel mixture 48 and reduce power consumption by the heater as engine warm-up occurs. If desired, a thermostat switch means 96 is mounted on the engine to be responsive to warming up of the engine for interrupting operation of the heater after engine warm-up has occurred, thereby to further improve the energy efficiency of the fuel supply system.

The fuel supply system 10 as thus far described is generally conventional as is shown in the patents previously referenced. However, the fuel supply means 12 is adapted in any conventional manner to furnish a mixture of air and alcohol or gasohol fuel to the engine; the heater means 54 is selected and proportioned to provide a predetermined degree of heating for the air-fuel mixture without undesirably exceeding the portion of the automotive power supply capacity alloted to be used for that purpose; and in accordance with this invention, the contact means 64 provided on the heater body 56 are particularly adapted for maintaining the heating effect of the heater means throughout a long service life of the fuel supply system 10 even though alcohol or gasohol fuels are used in the system. That is, in accordance with this invention, the contact means 64 provided on the heater body 56 each include a thin, inner, all-metal coating 98 of an electroless deposited nickel which is bonded directly to the ceramic material of the body in ohmic contact relation to the body as shown in FIG. 3. In accordance with this invention, each of the contact means 64 further include a thin, substantially pore-free, all-metal outer coating 100 of electrolytically deposited nickel which covers and protects the inner, ohmic contact coating 98.

In a preferred embodiment of this invention for example, the heater body 56 is molded of an yttrium-doped, barium titanate based, ceramic material having a positive temperature coefficient of resistivity which is adapted to display a sharp anomolous increase in resistivity when heated to a selected temperature. The material can have a room temperature resistivity of about 10–300 ohm-centimeters or the like, a Curie temperature of about 150° to 180° C. or the like, and displays a sharp increase in resistivity of several orders of magnitude or the like when heated above its Curie temperature. The heater body 56 preferably has the multipassaged form as above described, each of the passages 58 being of square cross section on the order of about 0.140 inches (3.5 mm.) on a side, each of the webs 59 having a thickness of about 0.040 inches (1 mm.), and the end to end thickness of the body being about 0.250 inches (6.25 mm).

Figure 2:
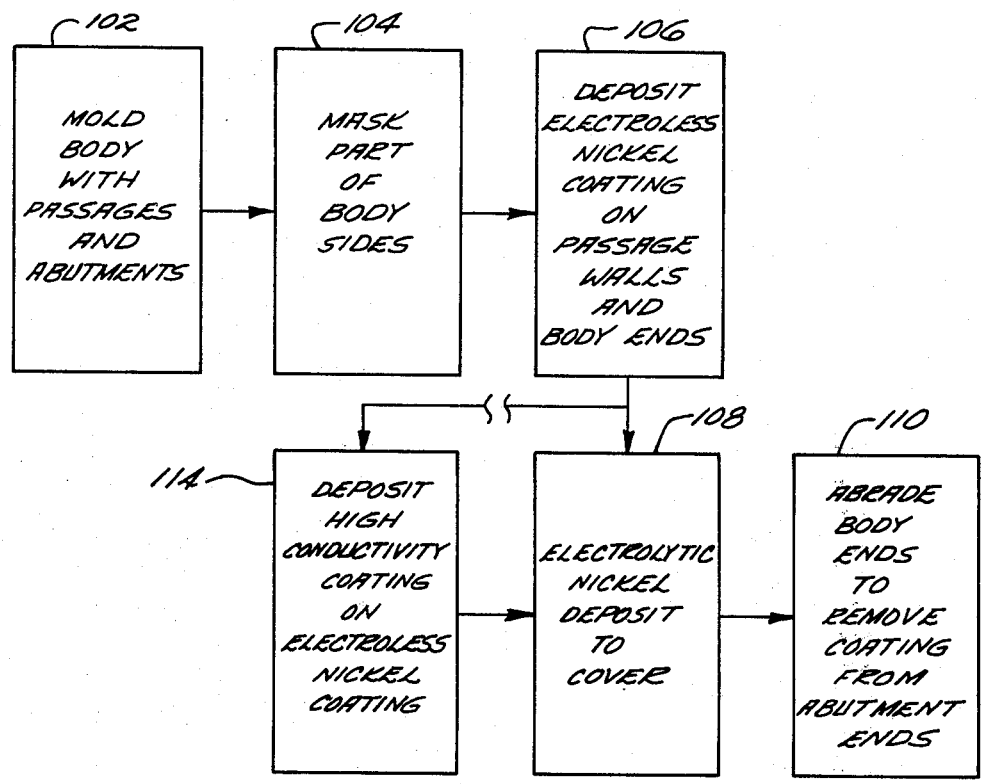
FIG. 2 is a block diagram illustrating steps in the process for making the self-regulating heater of this invention for use in the system of FIG. 1.

After forming the heater body 56 with passages 58 and abutments 60 by molding or in any other conventional manner as is diagrammatically illustrated at 102 in FIG. 2, a band of masking material such as silicone rubber or the like is applied around the outer periphery of the heater body as is diagrammatically illustrated at 104 in FIG. 2. (See also FIG. 3). The heater body is then provided with an inner electroless deposited nickel coating 38 which is bonded in ohmic contact relation to all of the unmasked surfaces of the body including the ends of the body, the abutments 60, and the inner walls of the body passages 58 to form the coating 98 as is diagrammatically illustrated at 106 in FIG. 2. In a preferred embodiment for example, the coating 98 is applied by immersing the masked heater body in an electroless nickel plating bath comprising an aqueous solution of a nickel salt and a sodium hypophosphite after sensitization or activation of the unmasked surfaces by immersion of the body in a palladium chloride-stannous chloride solution in a conventional manner. In such a bath, nickel ions are catalytically reduced by the hypophosphite ions at the unmasked surfaces of the ceramic titanate for coating the unmasked body surfaces with a nickel metal having a significant phosphorus content up to about 10 weight percent which makes good ohmic contact to the ceramic titanate and which is impervious to and substantially inert with respect to some reducing atmospheres such as certain hydrocarbon fumes and the like. Preferably, the electroless deposited nickel coatings as initially formed on the resistor body surfaces are subjected to a heat treatment at about 250° to 300° C. for 15–60 minutes for securing the coatings in excellent ohmic contact relation to the ceramic titanate of the resistor body in a conventional way. Preferably, the electroless deposition process is regulated in conventional manner so that the thickness of the inner coating 98 is uniform and continuous over the selected contact areas of the body and is free of openings or large pores but so that the coating is thin enough to be retained on the ceramic material without tending to peel or flake off the ceramic during thermal cycling of the heater. Preferably for example, the coating 98 has a thickness of about 0.0001 to 0.003 inches (0.0025–0.0075 mm.).

In one preferred embodiment, the coated heater body is then provided with an outer electrolytically deposited or electroplated nickel coating 100 which is deposited on the inner coating 98 to cover the inner coating over all of the unmasked surfaces of the heater body including the ends of the body, the abutments 60 on the body, and the inner walls of the body passages 58 as is diagrammatically illustrated at 108 in FIG. 2. Preferably for example, the electroless coated heater body is immersed in a nickel electroplating bath such as a conventional nickel sulfamate solution or the like. The coated body is connected as the cathode using a nickel anode and a thin, substantially pore-free coating 100 of the electrolytically deposited nickel having a thickness up to about 0.002 inches is formed on and securely bonded in any conventional manner to the inner contact coating 98. Preferably, the electrolytic coating 100 has a thickness in the range from about 100–500 microinches (0.0025–0.0125 mm.). The coated heater body is then abraded over the ends of the abutments 60 for removing the coating layers 98 and 100 from the tips of the abutments as is shown in U.S. Pat. No. 4,189,509 and as is diagrammatically illustrated at 110 in FIG. 2, thereby to form the heater body 56 as is illustrated in FIG. 3.

When that heater body is incorporated in the fuel supply system 10 as above described, and when the outer contact coating 100 has a thickness of about 500 microinches (0.0125 mm.), the two layer contact means 64 formed in the body have adequate current carrying capacity for operation of the heater 54 in the range from 15 to 30 amperes at 14 volts (at current density of about 1 to 2 amperes/cm.$^2$) to provide a desired heating effect in the fuel system 10. Further, when the heater body is tested in a mixture of 50% alcohol and 50% gasoline in a pressure vessel at a temperature of about 150° C. at a pressure of 180 psi. for one week corresponding to a substantial period of use in the noted fuel supply system, no significant corrosion of the two layer contact means 64 was observed and it is believed that the contact system 64 will have a very substantial service life in normal use in the fuel supply system 10.

EXAMPLE I

In this case, electroless nickel coatings of about 0.0001 inches (0.0025 mm.) thickness were deposited and heat-treated on multipassaged, yttrium-doped barium titanate ceramic bodies to form ohmic contact to the ceramic material as above described. Pore-free electrolytic nickel coatings having a thickness of about 0.002 inches (0.05 mm.) were deposited over the electroless nickel coating as above described. The coated ceramic bodies were then further processed as described above for forming heater units 54. The contact systems on the units were found to have low sheet resistances on the order of 9 to 11 milliohms per square unit.

Some of the heaters as thus produced were subjected to 20,000 heating-cooling cycles wherein a current of about 15 amps at 14 volts d.c. was applied to the heaters through the noted contacts for 30 seconds and was then interrupted for 90 seconds. After such thermal cycling, some of the units were subjected to corrosion testing by being disposed in pure gasoline in a pressure bomb at a pressure of 100 to 150 psi. at a temperature of 150° C. for 200 hours. Other units were similarly tested at a temperature of 180° C. Other units were similarly tested in a 50/50 by weight mixture of gasoline and alcohol in a pressure bomb at a pressure of 170 to 270 psi. for 200 hours at 150° C. while other units were similarly tested in the gasoline-alcohol mixture at 180° C. In each case, the contact systems on the heater units showed only slight discoloration, did not display any observable corrosion, retained good adhesion, and substantially maintained their original sheet resistance so that the heater units maintained a uniform heating effect.

Some of the heater units made as described above were disposed in an engine environment where they were cycled at 15 amps, 14 volts d.c. on for 30 seconds and off for 90 seconds for 300 hours while gasoline were dripped onto the heaters. Similarly, other units were held at a temperature of 180° C. in an air-alcohol vapor atmosphere for 200 hours. In each case, the contact system retained adhesion, maintained low sheet resistance, and did not display any corrosion. Some gumming of the contacts did occur in the pure gasoline test.

EXAMPLE II

Comparable heater units made as described above were provided with electroless nickel coatings having a thickness of about 0.0005 inches (0.0125 mm.) and with covering electrolytic nickel coatings of a thickness of about 0.002 inches (0.05 mm.). The contact systems of those units displayed original sheet resistance of about 7 to 9 milliohms per square unit. After being subjected to the same tests as described above with reference to Example I, the contact systems retained the same desirable characteristics as were described in Example I.

EXAMPLE III

Comparable heater units were made as described in Example I, these units having inner electroless nickel coatings of 0.0015 inches (0.0375 mm.) thickness and outer electrolytically deposited nickel coatings of about 0.001 inches (0.025 mm.) thickness. The contact systems of those units displayed sheet resistances of about 12 to 14 milliohms per square unit and, after testing as described in Example I, retained the same desirable contact characteristics as were described with reference to Example I.

EXAMPLE IV

Comparable heater units were made and tested as described in Example I, the units having inner electroless nickel coatings of about 0.002 inches (0.05 mm.) thickness and outer electrolytically deposited nickel coatings of about 0.0005 inches (0.0125 mm.) thickness. Those contact systems displayed sheet resistances of about 22 to 25 milliohms per square unit and retained their desirable characteristics as described in Example I following the testing.

EXAMPLE V

Similar heater units were made as described in Example I with inner electroless nickel coatings of about 0.0001 inches (0.0025 mm.) and with outer electrolytically deposited nickel coatings of a greater thickness on the order of 0.005 inches (0.125 mm.). These contacts displayed sheet resistances of about 1.5 to 2.0 milliohms per square unit but during thermal cycling as described in Example I, these thicker electrolytic contact coatings were found to be less satisfactory in that they tended to peel off to some extent during the cycling.

Figure 4:
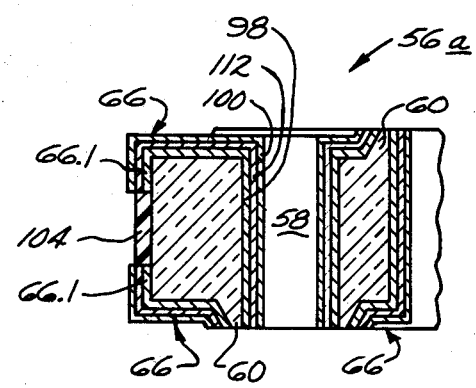
FIG. 4 is a partial section view similar to FIG. 3 illustrating an alternate embodiment of this invention.

In another alternate embodiment of this invention as shown in FIG. 4, the inner coating 98 is initially formed on all of the unmasked surfaces of the heater body 56 as above described. An additional coating 112 of a metal material such as silver or copper is then deposited on the inner coating 98 as is diagrammatically illustrated at 114 in FIG. 2, thereby to improve the current carrying capability of the contact means provided on the heater body. Preferably for example, the intermediate coating 112 is applied by immersing the masked and initially coated heater body in a conventional, commercially available electroless copper plating bath comprising copper nitrate-aldehyde bath or the like. Alternately, the coating 112 is formed of silver or is electrolytically deposited on the coating 98 in any conventional manner. Typically, the intermediate coating 112 has a thickness of about 0.0005 to 0.003 inches (0.0125–0.075 mm.) for providing the contact means in the heater body with current carrying capacity up to about 45 amperes. Outer coating means 100 of electrolytically deposited nickel are then formed over the intermediate coating 112 and the tips of the body abutments 60 are abraded as will be understood for forming the alternate heater body 56a as illustrated in FIG. 4.

EXAMPLE VI

In this case, electroless nickel coatings of about 0.0001 inches thickness were deposited and heat-treated on multipassaged, yttrium-doped barium titanate ceramic bodies to form ohmic contact to the ceramic material as above described. A layer of silver was then electrolytically deposited in a conventional manner over the electroless nickel coatings to a thickness of about 0.0001 inches (0.0025 mm.). The silver coatings were then covered with electrolytically deposited nickel coatings to a thickness of about 0.0005 inches (0.0125 mm.) After processing of the coated ceramic bodies to form heater units as above described, the heater units were tested as described with reference to Example I. The contact systems were found to have original sheet resistances of about 17 to 18 milliohms per square unit and after testing the contacts were found to retain desirable characteristics as described with reference to Example I.

EXAMPLE VII

Comparable units made as described in Example VI were provided with electroless nickel inner coatings having a thickness of about 0.0001 inches (0.0025 mm.) with intermediate electrolytically deposited silver coatings having a thickness of about 0.004 inches, and with outer electrolytically deposited nickel coatings of a thickness of about 0.0005 inches (0.0125 mm.). When subjected to testing as described with reference to Example I, the contacts were found to display original sheet resistances of about 6 to 7 milliohms per square unit and retained desirable characteristics as described in Example I.

It should be understood that although particular embodiments of the invention have been described by way of illustrating the invention, the invention includes all modifications and equivalents of the disclosed embodiments falling within the scope of the appended claims.

We claim:

1. A self-regulating electrical resistance heater particularly adapted for use in an alcohol-containing atmosphere comprising a body of ceramic material having a positive temperature coefficient of resistivity for limiting the self-heating thereof, and contact means bonded to the ceramic material for applying electrical power to the body to generate heat, characterized in that, the contact means comprise an inner coating of electroless deposited nickel which is bonded in ohmic contact relation to the ceramic material so that the inner coating permits electrical power to be efficiently applied to the ceramic body for achieving desired heat-up characteristics in the heater and so that the inner coating retains its ohmic contacting properties on the ceramic material during extended thermal cycling of the heater for maintaning said heat-up characteristics, and additional coating means including a substantially pore-free outer, corrosion resistant coating of an electrolytically deposited nickel covers and protects the inner coating from reaction with the atmosphere surrounding the heater during thermal cycling of the heater, whereby the inner coating continues to retain its ohmic contacting properties so that the heater maintains said heat-up characteristics.

2. A heater as set forth in claim 1 wherein said additional coating means comprises an electrolytically deposited coating of nickel formed directly on said inner coating to cover the inner coating.

3. A heater as set forth in claim 1 wherein said additional coating means comprises an intermediate coating of a metal material having relatively greater electrical conductivity than nickel deposited on said inner contact coating for covering the inner coating, and said electrolytically deposited nickel coating is formed on the intermediate coating for covering the intermediate coating.

4. A self-regulating electrical resistance heater particularly adapted for use in enhancing fuel evaporation in an automotive fuel supply system where the heater may be exposed to an alcohol-containing atmosphere comprising a body formed of a ceramic material which has a positive temperature coefficient of resistivity and displays a sharp increase in resistivity when heated above a predetermined transition temperature for limiting self-heating thereof, and contact means bonded to the ceramic body for applying electrical power to the body to generate heat, characterized in that, the contact means comprises a substantially pore-free inner coating formed entirely of an electroless deposited nickel material which is bonded in ohmic contact relation to the ceramic body so that the inner coating permits electrical power to be efficiently applied to the ceramic body from a low voltage power source for achieving desired heat-up characteristics in the heater and so that the inner coating retains its ohmic contacting properties while bonded to the ceramic body during extended thermal cycling of the heater to maintain said heat-up characteristics, and an additional substantially pore-free outer coating of corrosion-resistant electrolytically deposited nickel material adhered directly to the inner coating so that it covers and protects the inner coating from reaction with components of an alcohol atmosphere surrounding the heater during thermal cycling of the heater, whereby the inner coating retains its ohmic contacting properties and the heater retains its desired heat-up characteristics during use of the heater in an alcohol-based fuel supply system.

5. A heater as set forth in claim 4 wherein said additional coating has a thickness in the range from 500–2000 micro-inches (0.0125–0.05 mm.) for providing the contact means with substantial current-carrying capacity.

6. A self-regulating electrical resistance heater particularly adapted for use in enhancing fuel evaporation in an automotive fuel supply system where the heater may be exposed to an alcohol-containing atmosphere comprising a body formed of a ceramic material which has a positive temperature coefficient of resistivity and displays a sharp increase in resistivity when heated above a predetermined transition temperature for limiting self-heating thereof, same body having a plurality of passages extending in spaced side-by-side relation to each other through the body between opposite ends of the body for defining thin webs of the body material between adjacent body passages, and contact means bonded to the ceramic body along the inner walls of the body passages for directing electrical current through the thin webs of body material to generate heat, characterized in that the contact means each comprise a substantially pore-free inner coating formed entirely of an electroless deposited nickel material which is bonded in ohmic contact relation to the ceramic body so that the inner coating permits electrical current to be efficiently applied to the ceramic body from a low voltage power source for achieving desired heat-up characteristics in the heater and so that the inner coating retains its ohmic contacting properties while bonded to the ceramic body during extended thermal cycling of the heater to maintain said heat-up characteristics, and an additional substantially pore-free outer coating of electrolytically deposited nickel material covers and protects the inner coating from reaction with components of an alcohol atmosphere surrounding the heater during thermal cycling of the heater, whereby the inner coating retains its ohmic contacting properties and the heater retains its desired heat-up characteristics during use of the heater in an alcohol-based fuel supply system.

7. An automotive fuel supply system comprising fuel supply means for furnishing a mixture of air and an alcohol-based fuel to an internal combustion engine, and self-regulating electrical resistance heater means operable for heating at least one constituent of the air-fuel mixture for enhancing evaporation of the fuel being furnished to the engine, said heater means having a body of ceramic material of positive temperature coefficient of resistivity adapted to display a sharp increase in resistivity when heated above a predetermined transition temperature for limiting self-heating thereof and having contact means bonded to the ceramic material for applying electrical power to the body to generate heat, characterized in that, the contact means comprise an inner coating of electroless deposited nickel which is bonded in ohmic contact relation to the ceramic material so that the inner coating permits electrical power to be efficiently applied to the ceramic body for achieving desired heat-up characteristics in the heater and so that the inner coating retains its ohmic contacting properties on the ceramic material during extended thermal cycling of the heater for maintaining said heat-up characteristics, and additional coating means including a substantially pore-free outer, corrosion-resistant coating of an electrolytically deposited nickel covers and protects the inner coating from reaction with an alcohol atmosphere surrounding the heater during thermal cycling of the heater, whereby the inner coating continues to retain its ohmic contacting properties so that the heater maintains said heat-up characteristics.

8. An automotive fuel supply system as set forth in claim 7 wherein said additional coating means comprises an electrolytically deposited coating of nickel formed directly on said inner coating for covering the inner coating.

9. An automotive fuel supply system as set forth in claim 7 wherein said additional coating means comprises an intermediate coating of a metal material having relatively greater electrical conductivity than nickel deposited on said inner coating for covering the inner coating and an electrolytically deposited nickel coating is formed on the intermediate coating for covering the intermediate coating.

10. An automotive fuel supply system comprising fuel supply means for furnishing a mixture of air and an alcohol-based fuel through an internal combustion engine, ans self-regulating electrical resistance heater means operable for heating at least one constituent of the air-fuel system for enhancing evaporation of the fuel being furnished to the engine, said heater having a body of ceramic material of positive temperature coefficient of resistivity adapted to display a sharp increase in resistivity when heated above a predetermined transition temperature for limiting self-heating thereof, said body having a plurality of passages extending in spaced side-by-side relation to each other through the body between opposite ends of the body for defining thin webs of the body material between adjacent body passages, said body being mounted in the system for passing at least said one constituent of the air-fuel mixture through said body passages in heat-transfer relation to the body, and said body having contact means provided on the ceramic material extending along the inner walls of the body passages for directing electrical current through the thin webs of body material between adjacent body passages, characterized in that, the contact means each comprise a substantially pore-free inner coating of an electroless deposited nickel material which is bonded in ohmic contact relation to the ceramic body so that the inner coating permits electrical power to be efficiently applied to the ceramic body from a low voltage power source for achieving desired heat-up characteristics in the heater and so that inner coating retains its ohmic contacting properties while bonded to the ceramic body during extended thermal cycling of the heater to maintain said heat-up characteristics, and an additional substantially pore-free outer coating of a corrosion-resistant electrolytically deposited nickel material covers and protects the inner coating from reaction with components of an alcohol-based atmosphere surrounding the heater during thermal cycling of the heater, whereby the inner coating retains its ohmic contacting properties and the heater retains its desired heat-up characteristics during use of the heater in the fuel supply system.

* * * * *